United States Patent [19]
Dressler et al.
[11] 4,429,322
[45] Jan. 31, 1984

[54] METHOD OF FABRICATING A GLASS NOZZLE ARRAY FOR AN INK JET PRINTING APPARATUS

[75] Inventors: John L. Dressler, Spring Valley; Biswa N. Ganguly, Beavercreek, both of Ohio; Bertram VanBreemen, Indianapolis, Ind.

[73] Assignee: Mead Corporation, Dayton, Ohio

[21] Appl. No.: 349,135

[22] Filed: Feb. 16, 1982

[51] Int. Cl.³ .............................................. G01D 15/18
[52] U.S. Cl. .............................................. 346/140 R
[58] Field of Search .......................... 346/1.1, 75, 140; 239/596, 597, 601, 566

[56] References Cited

U.S. PATENT DOCUMENTS

| | | | |
|---|---|---|---|
| 2,266,349 | 12/1941 | Wempe | 29/163.5 |
| 2,996,419 | 8/1961 | Schmick | 154/128 |
| 3,156,950 | 11/1964 | Walton | 18/8 |
| 3,294,504 | 12/1966 | Hicks | 65/3 |
| 3,737,367 | 6/1973 | Roberts et al. | 346/140 IJ X |
| 3,754,882 | 8/1973 | Van Esdonk et al. | 65/42 |
| 4,019,886 | 4/1977 | Hoffman et al. | 65/43 |
| 4,047,186 | 9/1977 | Kendall et al. | 346/140 IJ |
| 4,112,170 | 9/1978 | Rauscher | 346/140 IJ X |
| 4,112,436 | 9/1978 | Cone | 346/140 IJ |
| 4,122,460 | 10/1978 | Humenik et al. | 346/140 IJ |
| 4,166,564 | 9/1979 | Wolber | 228/156 |
| 4,212,707 | 7/1980 | Tosswill et al. | 204/26 |

FOREIGN PATENT DOCUMENTS 1492088 11/1977 United Kingdom .

OTHER PUBLICATIONS

McGraw-Hill Dictionary of Scientific and Technical Terms, Second Edition, pp. 58 & 1491.
I.B.M. Technical Disclosure Bulletin, vol. 17, No. 11, Apr. 1975, p. 3269.
I.B.M. Technical Disclosure Bulletin, Aug. 1977, vol. 20, No. 3, p. 911.
I.B.M. Technical Disclosure Bulletin, Feb. 1978, vol. 20, No. 9, pp. 3488–3489.
I.B.M. Technical Disclosure Bulletin, Dec. 1980, vol. 23, No. 7A, pp. 2708–2710.
I.B.M. Technical Disclosure Bulletin, vol. 18, No. 12, May 1976, Cheroff et al.

*Primary Examiner*—Donald A. Griffin
*Attorney, Agent, or Firm*—Biebel, French & Nauman

[57] ABSTRACT

Glass fibers having an etchable or leachable core are used to fabricate glass nozzle arrays. A plurality of fibers are aligned in spaced parallel relationship with one another, and their major longitudinal portions are encapsulated with either a resin material or solder glass to form a block of material. This block is sliced orthogonally to the longitudinal axes of the fibers to form thin sections of nozzle arrays. After lapping and polishing, the inner cores of the glass fibers are etched out to form orifices. The use of solid core glass fibers prevents the nozzles from filling or becoming clogged with debris and dust from preceding forming operations.

8 Claims, 8 Drawing Figures

METHOD OF FABRICATING A GLASS NOZZLE ARRAY FOR AN INK JET PRINTING APPARATUS

BACKGROUND OF THE INVENTION

The present invention relates to glass orifice nozzle arrays and methods of producing them, and more particularly to glass orifice nozzle arrays suitable for use in an ink jet printing apparatus as orifices in an orifice plate or charge plate assembly.

Ink jet printing apparatuses of the type in which the present invention is useful produce a plurality of uniform drops aligned parallel to one another and perpendicular to the movement of paper or other material upon which printing is to be effected. The printing is produced by using a reservoir of a printing fluid, such as ink, with a plurality of aligned orifices at the bottom of the reservoir. The ink is ejected through these orifices at a predetermined rate and is stimulated in such a manner that uniform drops of ink are formed at the ends of the filaments of ink which issue from the orifices. A series of charging electrodes are positioned adjacent the points of drop formation and are connected to sources of changing control voltage, so that corresponding electrical charges are induced upon the drops at their respective times of formation. The drops then pass through an electrical deflection field which causes drop deflection in correspondence with the applied changes. Drops which are uncharged may be directed into an appropriate positioned catcher. Alternatively, drops which are charged above some predetermined level may be directed into the catcher.

Economical methods of forming the orifices in an orifice plate or holes in a charge plate are difficult to find since the nature of the system requires the use of extremely small diameter holes in these plates. For example, the orifices in a typical orifice plate are generally in the range of 0.0005 to 0.0015 inches in diameter and the holes in a typical charge plate are generally in the range of from 0.005 to 0.010 inches in diameter.

It has been recognized that orifice plates for ink jet printing apparatuses may be fabricated from hollow glass capillary tubes which have been aligned to form a uniform array of orifice nozzles. For example, Cone, U.S. Pat. No. 4,112,436, teaches forming an orifice plate having glass nozzles by aligning a number of small inside and outside diameter hollow glass tubes on a glass substrate, pouring an epoxy resin around the tubes, and applying a second glass plate over the assembly to form a sandwiched block. After curing, the block is sawed orthogonally to form thin sections of glass nozzle arrays. The sections are lapped and polished and then affixed to a rigid backing plate.

Likewise, Humenik et al, U.S. Pat. No. 4,122,460 discloses forming an orifice plate using a number of hollow glass capillary tubes. The tubes are aligned on a supporting substrate, covered with a second support structure, and then clamped and positioned so that they are vertical. Solder glass is then placed in longitudinal grooves cut into the support structure, and the assembly is heated to melt the solder glass which flows by capillary action into the spaces between the tubes and seals the grooves. After cooling, the assembly is sawed into thin sections forming the nozzle arrays and then lapped and polished.

However, the use of hollow glass tubing in forming the nozzle arrays causes problems during the sawing, lapping, and polishing stages of the process. The small, deep apertures of the orifices in the nozzle array tend to collect and fill up with the debris and dust produced during the sawing, lapping, and polishing steps. Since the tubes must be completely clear of any obstructions when used in ink jet printing apparatuses, this tendency to collect debris and dust necessitates time consuming and not altogether successful cleaning operations to keep the tubes clear.

It has been proposed to place wax in the glass tubing to prevent other material from entering the tubing during processing. The wax can be removed by heating the nozzle array to above the melting point of the wax. However, it is quite difficult to get wax or other similar material into the extremely small diameter openings in the glass tubing. Moreover, it may be necessary to repeat the wax filling sequence several times during the fabrication process, especially if there are heating steps such as the melting of solder glass since the wax will tend to melt and flow out of the tubing during such steps.

Accordingly, the need exists in the art for a process for fabricating glass orifice nozzle arrays for use in ink jet printing apparatuses which avoids the problems of collection and accumulation of debris in the apertures of the nozzles.

SUMMARY OF THE INVENTION

The present invention meets that need through the use of solid core composite glass fibers in the fabrication of nozzle arrays. The composite fibers comprise a core of soluble or etchable glass and a sheath of a more durable glass such as soda-lime glass. The glass nozzle array of the present invention comprises a plurality of parallel aligned composite glass fibers encapsulated in a block of a suitable substrate material. The size of the composite glass fibers, the core diameter, and the spacing of the fibers may all be varied so that the glass nozzle arrays can be used both for orifice plates and for providing holes for charge plates in ink jet printing apparatuses.

In forming the glass nozzle array, appropriately sized composite glass fibers are positioned in parallel alignment with each other. Several suitable aligning methods may be utilized including the method disclosed in Cone, U.S. Pat. No. 4,112,436. Cone teaches etching parallel V-grooves in a silicon wafer which is then split to form a pair of support wafers. These wafers are secured to a frame having an underlying glass plate in spaced relation in a horizontal plane, and hollow glass fibers are positioned in the grooves. Epoxy resin is then poured over the glass fibers and fills the spaces between the fibers themselves and the fibers and the underlying glass plate. A second glass plate is then placed over the epoxy resin, and the assembly is clamped with the two glass plates in spaced parallel relationship forming a sandwich around the glass fibers. Once the epoxy resin cures, the assembly is sliced orthogonally to form thin nozzle array sections.

In an alternative method, the glass fibers are aligned in spaced parallel relationship in a mold and a molding compound such as an epoxy resin is poured over and around the fibers and permitted to cure. In yet another alternative method, the glass fibers are aligned in parallel spaced relationship on a glass or ceramic support plate using double-faced adhesive tape to hold the fibers in position while a ceramic paste is applied. After heating to cure the ceramic paste, solder glass frit is dusted over the fibers and then compacted with ultrasonic vibration. Finally, a cover plate of glass or ceramic is positioned in contact with the solder glass. The sandwich assembly is then heated again to seal the fibers and solder glass. The assembly is then sliced into thin sections.

The thin sections, fabricated by any of the above methods, are then lapped to a uniform thickness. Each uniform thin section is then attached to a glass support plate and lapped or ground again down to its final design thickness. Throughout the fabrication operations, the composite glass fibers of the present invention are maintained with their solid cores in place. This completely avoids the accumulation of any debris or dust generated during the slicing and lapping operations in the glass fibers and also avoids any accidental accumulation of any epoxy resin, solder glass, or the like from earlier operations in the fibers.

After the thin sections are lapped and polished to their final dimensions, the cores of the individual fibers may be readily removing by an etching operation to provide a finished glass nozzle array. The etching operation provides the additional benefit, if the glass fibers were initially sealed with solder glass, of etching away a minor portion of the solder glass. This causes the ends of the nozzles to project slightly beyond the solder glass and more precisely define the limits of the menisci formed by the jets of ink issuing from the orifice plate and results in the attainment of straighter jets.

Accordingly, it is an object of the present invention to provide a method of fabricating glass nozzle orifice arrays for use in ink jet printing apparatuses which utilizes etchable or soluble solid core glass fibers to prevent the accumulation of debris in such fibers during fabrication of the nozzle arrays. This and other objects and advantages of the invention will become apparent from the following description, the accompanying drawings, and the appended claims.

DETAILED DESCRIPTION OF THE PREFERRED EMBODIMENTS

Figure 1:
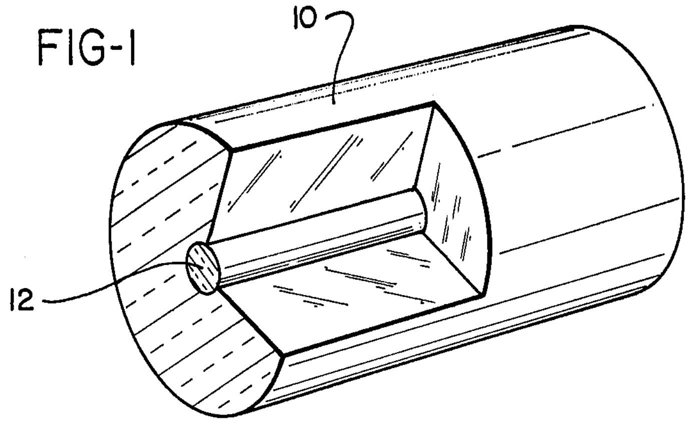
FIG. 1 is a partially cut-away perspective view of a typical solid core glass fiber used in the practice of the present invention.

In accordance with the present invention, solid core glass fibers are utilized to form glass nozzle arrays. As shown in FIG. 1, a glass fiber 10 has an inner core 12 of an etchable or soluble glass. Glass fiber 10 may be fabricated of a durable glass able to withstand high temperatures and resistant to chemical etchants such as soda-lime glass. Inner core 12 may be fabricated of an acid soluble or leachable glass such as a barium or lead borosilicate glass. If the glass fiber is to be used in a nozzle array in an orifice plate, the outer diameter of the fiber is preferably about 0.005 inches while the diameter of the inner core is about 0.0005 to 0.0015 inches. The fibers may be drawn down to these diameters by techniques which are known in the art. If the glass fiber is to be used in a charge plate assembly, larger diameter fibers may be used. These are typically in the range of an inner core diameter of from 0.005 to 0.010 inches and an outer fiber diameter of from 0.02 to 0.05 inches.

In one embodiment of the invention, the glass fibers may be aligned in parallel relationship using a pair of silicon wafers which have been etched to form parallel and uniformly spaced V-shaped grooves in their surfaces. An explanation of this etching process may be found in A. I. Stoler, "The Etching of Deep Vertical-Walled Patterns in Silicon", RCA Review, June 1970, pages 271–275. A single etched wafer is then split to form the pair of wafers used to support the glass fibers. As shown in FIG. *2a,* the ends of glass fibers 10 are supported in uniformly spaced, parallel relationship in V-grooves 14 of wafer 16.

Figure 3:
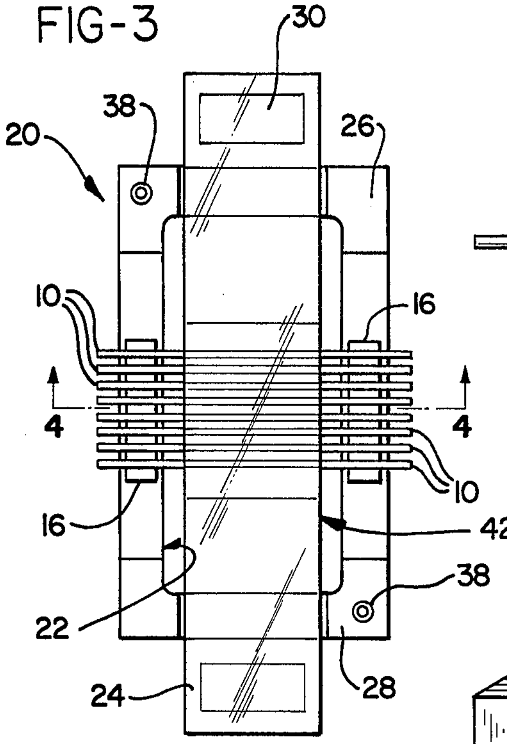
FIG. 3 is a top plan view of a frame structure for supporting the sandwich construction illustrated in FIG. 5.
Figure 4:
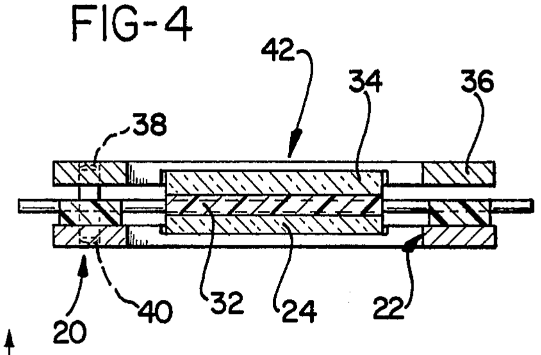
FIG. 4 is a cross-sectional view along line 4—4 of FIG. 3.

As best shown in FIGS. 3 and 4, after the V-grooves 14 are etched into the surface of silicon wafer 16, a pair of wafers 16 are then secured to a frame member 20 of generally rectangular cross-section having a rectangular opening 22 defined therein. The silicon wafers 16 are secured to opposite sides of the frame member 20 with respective V-grooves in each wafer 16 aligned and parallel to one another so as to support glass fibers 10 in parallel relation in a common plane.

A bottom glass plate 24 is then positioned across the frame perpendicular to the position where glass fibers 10 will be positioned. Depressions in the end portions 26 and 28 of the frame are provided so that the upper surface of the bottom glass plate 24 will lie below the plane containing glass fibers 10 so that the glass plate 24 will not be in contact with glass fibers 10. Bottom glass plate 24 is also provided with two rectangular spacer members 30 of any suitable material such as a rigid plastic for providing proper spacing between top and bottom glass plates.

The glass fibers 10 are then placed with their opposite end portions in respective grooves in each of the aligned silicon wafers 16 to form the array illustrated in FIGS. 3 and 4. An epoxy resin or solder glass 32 is then applied to the fibers 10 and bottom glass plate 24 so that all of the openings between the fibers and between the fibers and the bottom glass plate are filled. The solder glass may be applied in powder form. Care should be taken to avoid the formation of air bubbles in the epoxy resin or solder glass and a sufficient amount of resin or solder glass must be provided so that it extends above fibers 10. A top glass slide 34 is then positioned on top of spacers 30 in contact with the upper surface of resin or solder glass 32 to form the sandwich construction illustrated in FIGS. 4 and 5.

A second frame member 36 is then positioned above frame member 20 in engagement with the top surface of glass slide 34. A pair of locating pins 38 are secured to diagonally opposite corners of frame member 36 and are inserted in corresponding holes 40 in frame member 20 to assist in aligning the two frame members. A weight or suitable pressure is then placed on top of top glass slide 34. This maintains the assembly 42 comprising the two glass plates 24 and 34, the epoxy resin or solder glass 32, and glass fibers 10 in proper alignment while the epoxy resin is curing or the solder glass is fired.

Figure 5:
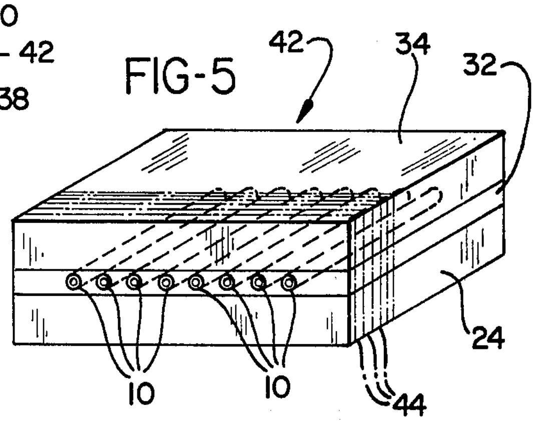
FIG. 5 is a perspective view of the sandwich construction from which the nozzle arrays are formed in accordance with one or more embodiments of the invention.
Figure 6:
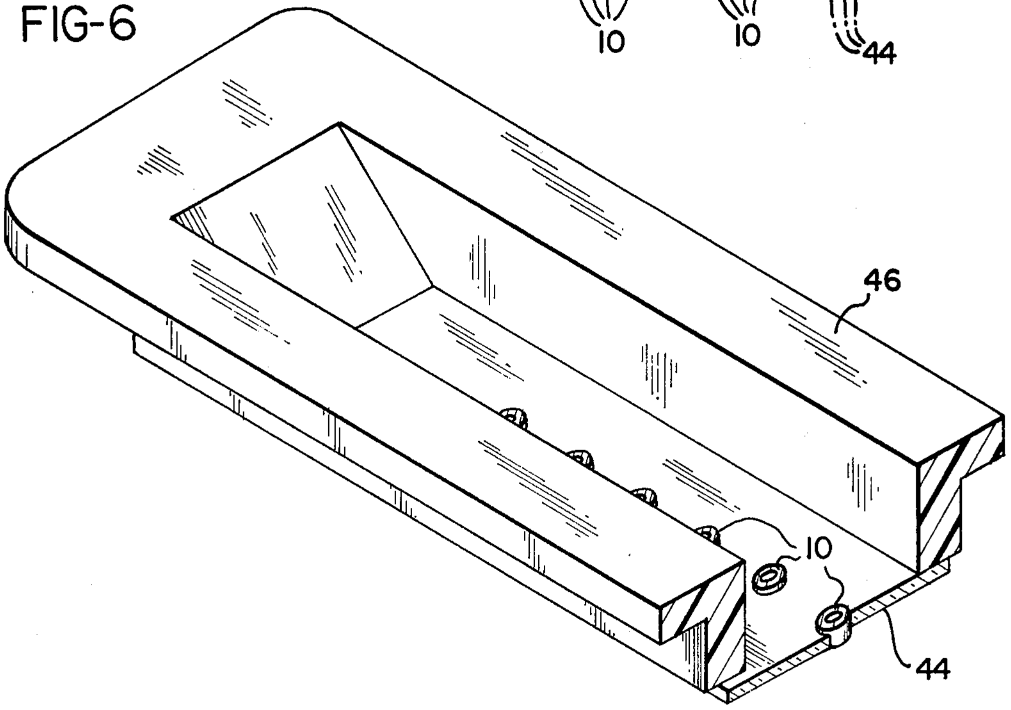
FIG. 6 is a perspective view, partially in section, of a nozzle array fabricated in accordance with the present invention used as an orifice plate in a printing fluid reservoir assembly.

Once the resin has cured or the solder glass has been fired, the frame members 20 and 36 are disassembled and removed from assembly 42. The assembly 42, as illustrated in FIG. 5, is then placed in a cutting jig and properly positioned for cutting in a cutting apparatus such as a wire saw or the like. For example, wire saws having a 0.01 inch stainless steel wire cutting edge and lubricated with a 400 grit silicon carbide powder in a glycerol-water slurry have been found to be suitable. The assembly 42 is cut, as shown by the dashed lines in FIG. 5, so that the thin slices forming the glass nozzle arrays 44 are cut orthogonal to the length of the glass fibers.

Preferably, when the assembly 42 is cut, the individual arrays 44 are cut somewhat larger than the desired final thickness, typically 0.015 to 0.020 inches. The array 44 is then polished and lapped to insure a uniform thickness. The array is then positioned over the opening slit of an orifice plate holder assembly 46 and cemented to it by solder glass or an epoxy adhesive. The now assembled array is then given a final polishing to reduce it to its typical design thickness of from 0.002 to 0.005 inches.

The core of each nozzle 46 is then removed by an etching or leaching procedure utilizing, typically, an aqueous solution of a mineral acid such as a 10% aqueous solution of hydrofluoric or hydrobromic acid. The etching procedure is well-known, see Tosswill et al, U.S. Pat. No. 4,125,776 and Hicks, U.S. Pat. No. 3,294,504, and proceeds rapidly at room temperatures. An additional benefit of this etching procedure is that if a solder glass has been used as the encapsulating material for the glass fibers, it will generally be somewhat sensitive to the etchant or leachant used to remove core material 12 from the nozzles. This results in some sight dissolution of the solder glass and causes the ends of each nozzle to project slightly above the surrounding solder glass matrix. This is a benefit since the projecting nozzles will more precisely define the limit of the meniscus formed by each jet of ink as it is forced under pressure from each nozzle in the array. This makes it much easier to obtain both uniform and straight ink jets.

Figure 2A:
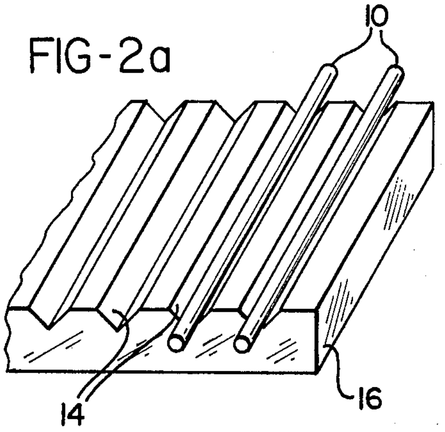
FIG. 2*a* is a perspective view of a notched glass fiber support member used to maintain the fibers in proper alignment during forming of the sandwich construction illustrated in FIGS. 3 and 4.
Figure 2B:
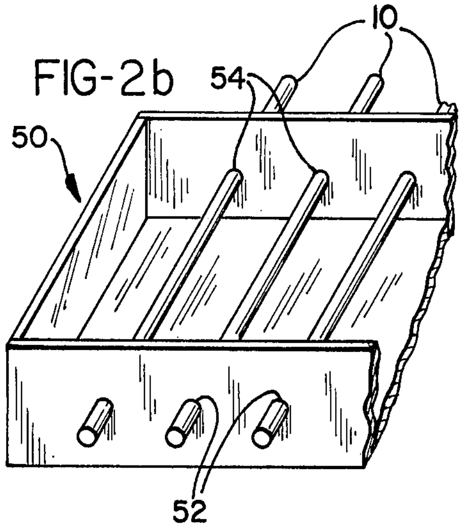
FIG. 2*b* is a perspective view of a portion of a jig mold used to maintain the fibers in proper alignment during the formation of a molded block containing the fibers.

In an alternative embodiment of the invention which is illustrated in FIG. 2*b*, glass fibers 10 are positioned in a jig mold 50 by aligning them in holes 52 and 54 formed on opposites sides of the mold. Holes 52 and 54 are so aligned and spaced that the glass fibers are in parallel relationship and have the center-to-center spacing desired for the particular end use to which they will be put.

A casting resin such as an epoxy resin or a powdered solder glass is then placed in the mold completely covering fibers 10. The resin is then cured or the solder glass fired to form a block which is quite similar in structure to assembly 42 in FIG. 5 except that it is a unitary block with no outer layers sandwiching the fibers. After removal from mold 50, the block is sliced into thin sections as described above and then lapped and polished. The cementing, final lapping and polishing, and etching steps are also as described above to form the finished orifice plate assembly.

Figure 2C:
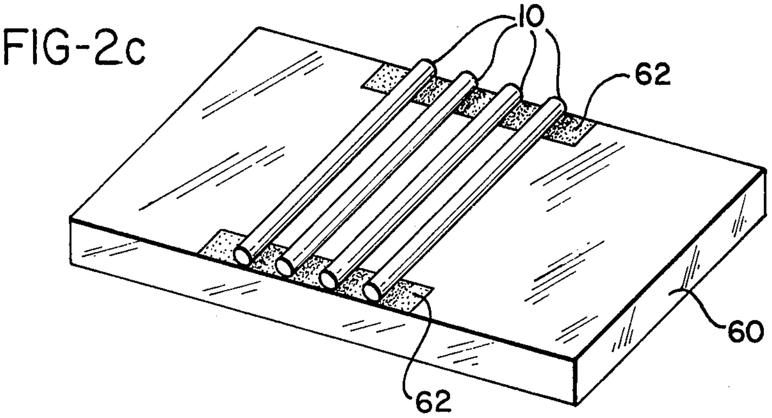
FIG. 2*c* is a perspective view of a glass support plate having double-faced adhesive tape on two edges thereof used to maintain the glass fibers in proper alignment during forming of a sandwich construction as illustrated in FIGS. 3 and 4.

In yet another alternative embodiment of the invention, which is illustrated in FIG. 2*c*, a flat glass or ceramic plate 60 is utilized as the supporting substrate for the assembly. Glass fibers 10 are aligned in parallel spaced relationship and are temporarily maintained in position by double-faced adhesive tape strips 62 which have been previously positioned long opposite edges of the substrate surface.

A ceramic paste is then applied toward the respective ends of fibers 10 in the area immediately inside adhesive tape strips 62 to seal the fibers permanently to the substrate 60. After application of the paste, the assembly is permitted to air dry and is then fired in a furnace to a temperature which is adequate to insure permanency of the ceramic paste.

The assembly is then cooled, and a layer of powdered solder glass frit is dusted onto the array of fibers. After dusting, the assembly is subjected to ultrasonic vibration to pack densely the solder glass without forcing any of the fibers out of position. The dusting and ultrasonic vibration steps are repeated until a dense supporting matrix of solder glass is built up around and over the fibers. After the fibers are covered to an appropriate thickness, a second glass or ceramic cover plate is placed over the assembly with care being taken that no air is trapped.

A final ultrasonic vibration treatment with the simultaneous application of pressure to the support and cover plates prepares the assembly for a second firing. The assembly is then fired at a temperature which insures that the solder glass melts, seals the fibers, and starts to devitrify. The assembly is then sliced into thin sections, lapped and polished, the thin section cemented to an orifice plate holder, and the cores of the fibers etched away as previously described to form the finished assembly.

Because all of the processing steps for forming the nozzle array are carried out with the solid core of the glass fiber being intact, there are no problems with the collection of debris or dust in orifices. Additionally, there is no need for repetitious filing of the orifices with a protective wax or the like. Because the etching or leaching out of the core is the final step of the process, the orifices are not subjected to the dust and debris formed by earlier processing steps.

Additionally, the final etching or leaching step provides the benefit of slightly etching away the solder glass which encapsulates the glass fiber nozzles so that the nozzle tips project slightly above the surrounding matrix of solder glass. This aids in more precisely defining the limit of the menisci formed by the jets of ink as they issue from each nozzle and results in the achievement of straighter jets.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. A method of fabricating a glass nozzle array for use in an ink jet printing apparatus comprising the steps of, supporting a plurality of solid core composite glass fibers in spaced parallel arrangement, encapsulating the major longitudinal portions of said plurality of fibers in an encapsulating material selected from the group consisting of epoxy resin and solder glass to form a block of said encapsulating material having said fibers in parallel spaced relationship therein, cutting said block orthogonal to the longitudinal axes of said fibers at a predetermined thickness to form at least one nozzle array, and etching said solid core from said fibers to form the orifices in said at least one nozzle array.

2. The method of claim 1 in which said fibers are supported on their respective ends by a pair of spaced supports having regularly spaced V-grooves therein.

3. The method of claim 1 in which said fibers are supported on their respective ends by strips of double-faced adhesive tape.

4. The method of claim 1 in which said encapsulating material is solder glass, and said solder glass is applied in powdered form over said fibers to encapsulate them.

5. The method of claim 4 including the steps of dusting said solder glass over said fibers in a series of layers and subjecting said fibers and solder glass to ultrasonic vibrations between dusting steps.

6. The method of claim 5 including the steps of placing a cover plate over said solder glass and fibers to form an assembly and simultaneously applying pressure and ultrasonic vibrations to said assembly.

7. The method of clim 6 including the step of firing said assembly at a temperature which causes said solder glass to melt, seal around said fibers, and partially devitrify.

8. The method of claim 4 in which said etching step causes said solder glass encapsulating the nozzles in said nozzle array to be partially removed resulting in said nozzles projecting above the surface of the surrounding solder glass.

* * * * *